March 24, 1959     H. FRIEDMAN     2,879,399
RADIATION THICKNESS GAUGE
Filed Jan. 26, 1954
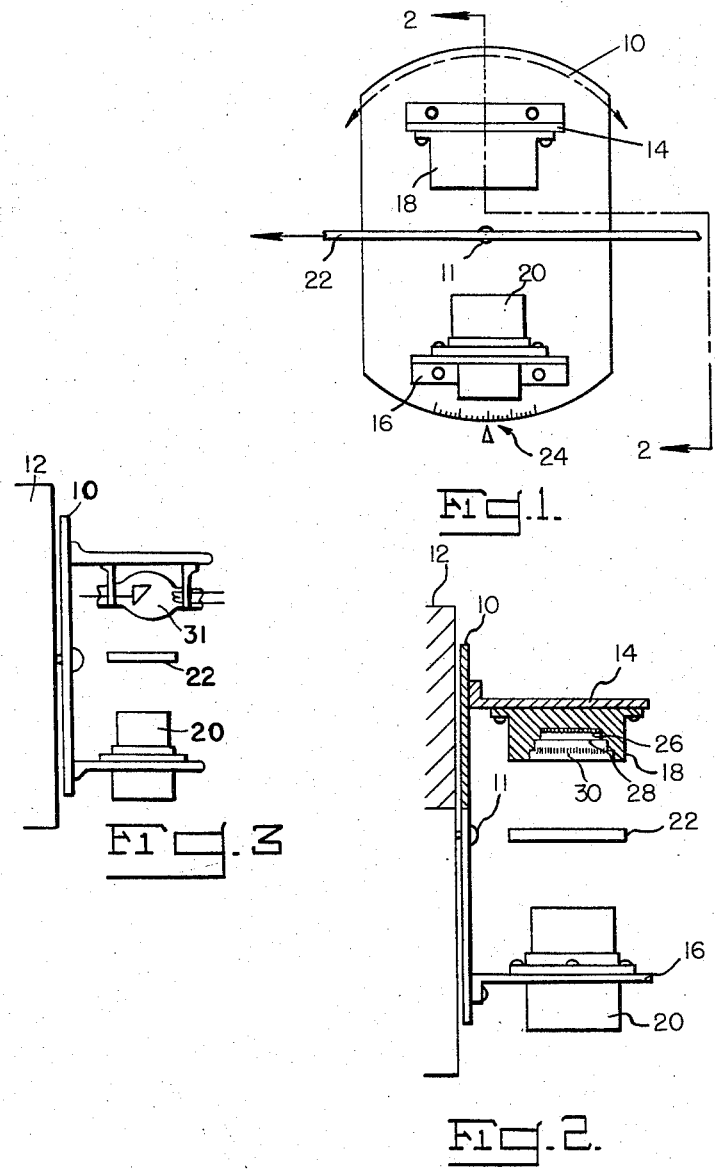
INVENTOR.
HERBERT FRIEDMAN
BY
ATTORNEY

United States Patent Office 2,879,399
Patented Mar. 24, 1959

2,879,399

RADIATION THICKNESS GAUGE

Herbert Friedman, Arlington, Va., assignor, by mesne assignments, to J. J. Maguire, trading as J. J. Maguire Company, Washington, D.C.

Application January 26, 1954, Serial No. 406,213

7 Claims. (Cl. 250—83.3)

This invention relates to a thickness gauge for industrial purposes utilizing a source of radiation, such as beta rays. The essential elements of this gauge are a source of radiation, such as beta radiation, and a suitable detector. Sheet material, the thickness of which is to be measured is located between the source and the detector. A portion of the radiation emanating from the source is absorbed by the sheet material in proportion to its mass per unit area. A properly designed detection meter, hence, may be made to read mass per unit area or percentage deviation from a given mass per unit area. Chemical composition and physical state of the material have negligible effect on the measurement. Only mass per unit area is involved in the absorption process.

The above described phenomenon of radiation absorption applies to X-rays as well as beta rays. Monochromatic X-rays are absorbed according to an exponential law and a plot of the logarithm of X-ray transmission versus thickness is therefore a straight line whose slope depends on the wavelength. If the logarithm of beta ray transmission is plotted versus thickness, the resulting curve is concave toward the abscissa (thickness) and approaches the abscissa nearly perpendicularly after an attenuation of about $10^3$. This limiting thickness is known as the range of the radioactive beta rays of a particularly maximum energy. The higher the energy, the greater is the range.

In current practice, the wavelength of X-rays or energy of beta rays is selected to suit the thickness range of the material being gauge. The gauging apparatus uses a radiation source on one side of the sheet and a detector on the other side. If X-rays are used, the gauging range can be adjusted by varying the voltage on the X-ray tube. If beta rays are used, however, different isotope sources must be substituted to cover different thickness ranges.

The object of this invention is to provide a thickness gauge of the type described above in which a source of radiation, such as beta rays, is employed and the necessity of substituting different energy sources for different ranges of thickness or mass per unit area measurements is eliminated. The invention accomplishes this while maintaining a uniform scale calibration of percentage thickness variation over a wide range of thicknesses. The only limitation on the wide range of thickness or mass per unit area measurements which can be thus made is the range of the highest energy beta ray isotope available as a radiation source.

To accomplish the above described object the source of radiation and the detector are mounted in fixed relationship at the ends of two arms of a yoke. The sheet to be gauged may run between the arms of the yoke. The position in which transmission is normal to the plane of the sheet will be used with the maximum thickness to be gauged. If a thinner sheet is to be gauged, the yoke is turned until the oblique pathlength of radiation in the sheet is equal to the normal pathlength in a sheet of maximum thickness. This angular setting may be made for any thickness for maximum to minimum, that one desires to gauge. As a result, the effective thickness gauged is always the same and the scale of percentage change does not vary over the entire range of sheet thicknesses to be gauged.

When radioactive material emits beta radiation, the beta particles are emitted at various energy levels. All of the beta particles emitted by a given isotope, in other words, are not emitted with the same energy and there is a definite energy spectrum for a given radioactive isotope. The penetration of the beta ray particles through matter depends upon their initial energy. Therefore, if a source of beta particles is placed near to a sheet of material the number of particles which penetrate is determined by the thickness of the sheet.

It is desirable that a source of beta radiations have the properties of a long half-life, an absorption characteristic having a slope in the region to be measured, the proper chemical and physical properties to constitute a durable and effective source, and the relative absence of gamma radiation from its spectrum so as to minimize the health hazard. In the table below are listed certain isotopes which have been used for this purpose.

| Isotope | Half-Life | Energy of Beta Radiation | Range of Applicability (mgm./cm.²) |
|---|---|---|---|
| Carbon 14 | 5,700 years | 140 k.e.v. | |
| Sulphur 35 | 87 days | 140 k.e.v. | |
| Thallium 204 | 3 years | 700 k.e.v. | |
| Strontium 90 | 25 years | 600 k.e.v. 2.2 m.e.v. | 4–800 100–1,100 |
| Ruthenium 106 | 300 days | 3.05 m.e.v. | |

Reference is now made to the drawings which illustrate an embodiment of the invention. Fig. 1 is a front elevation of the mounting assembly for the source and detector of the invention. Fig. 2 is a view partly in cross-section taken along the lines 2—2 of Fig. 1.

A yoke member 10 is centrally pivoted at 11 to a support or base 12. Brackets 14 and 16 carried by the yoke support a suitable beta ray source and detector 18 and 20 respectively. The sheet material 22, the thickness of which is to be measured passes between the source 18 and the detector 20 as indicated.

Figures 1 and 2 show the axes of source 18 and detector 20 normal to the sheet material 22, which is the angular position of the yoke 10 used when material of maximum thickness is to be measured. When sheet material of lesser thickness is to be gauged the yoke 10 is rotated in either direction until the oblique path of beta radiation through the sheet material is the same length as the normal path through material of maximum thickness. If material of different density is substituted then the yoke 10 is rotated until the same mass per unit area of the sheet material is penetrated by the beta rays. Suitable indicia associated with the yoke 10 and base 22, as indicated at 24 in Fig. 1, may be calibrated to accommodate readily different thicknesses and different materials. When the detector is calibrated to read percentage change of thickness the same scale can be used over the entire range of thickness to be measured. This follows since a percentage change of mass per unit area, which is what the detector measures, is directly proportional to the average percentage change of thickness of the sheet material over the area penetrated by the beta rays detected at 20.

Fig. 2 shows in cross-section one suitable form of holder for a source of beta radiations. A metal base is indicated at 18. A deposit of the source is shown at 26. A metal foil 28 hermetically seals the isotope deposit. A wire gauze 30 covers the metal foil 28 for the purpose of protecting the radioactive source from damage. Fig. 3 is an elevational view of a modification using X-rays.

For the purpose of clarity this invention has been disclosed in an embodiment reduced to its simplest form, consisting of a support for a beta ray gauge angularly adjustable with respect to sheet material, the thickness of which is to be measured. In its simplest form, the detector may be an ionization chamber to which a micro-micro-ammeter is connected. For the sake of simplicity the detector 20, indicated in the drawings, will be understood to represent any suitable detector and intensity indicating means, since such details are not a necessary part of the invention disclosure. It is to be understood that changes may be made in details of construction and arrangement of parts without departing from the spirit and scope of this invention. For example, any source of radiations whose absorption by material is substantially proportional to the mass of the material beneath the surface area subject to the radiations in a device of this type comes within the purview of this invention. Fig. 3 shows the same support and detector arrangement as Fig. 1 but with a suitably energized X-ray source 31 as a source of radiation supported on bracket 14. Monochromatic X-rays from the source 31 are absorbed according to an exponential law relating to the mass of material 22 per unit of irradiated area and the intensity of the emerging radiation detected by the detector 20 is an indication of the thickness of sheet 22. The rotation of the yoke 10 to adapt the calibration for different materials and thickness dimensions is accomplished in a manner similar to that used for beta radiation. While a source of beta rays is specifically disclosed as a preferred embodiment because this invention solves a difficulty particularly presented by the use of such a source, it is obvious that the use of X-ray sources or any other source of radiations whose absorption by material is substantially proportional to the mass of the material beneath the surface area irradiated in a device of this type is within the scope of this invention as defined by the appended claims.

I claim:

1. A device for measuring the thickness of material comprising a source of penetrative radiations, the absorption of which radiations are substantially proportional to the thickness of said material on which the radiations are directed, a detector for said radiations, supporting means for said source and said detector, the said radiations being directed against one surface of said material, the said detector receiving those radiations which penetrate said material means indicating the intensity of the detected radiations, said supporting means having relatively rotatably adjustable relationship with respect to said material to vary the angle between the path of said radiations through said material and said one surface thereof, and means for indicating the adjustment of said angle in relation to the nominal thickness of said material whereby the mass per unit surface area of a standard thickness of material in the path of said radiations may be substantially the same throughout a range of thickness of specimens of said material to be measured.

2. A device for measuring the thickness of material comprising a source of penetrative radiations, the absorption of which radiations by said material is substantially proportional to the thickness of said material, a detector for said radiations, a yoke member so supporting said source and said detector with respect to said material that the said radiations are directed against one surface of said material and said detector receives the said radiations which penetrate said material means indicating the intensity of the detected radiation, said yoke means being rotatably adjustable with respect to said material and means for indicating the rotatable adjustment of said yoke in relation to the nominal thickness of said material whereby the angle between the path of said radiations through said material and said one surface may be varied so that with a given source of radiations the mass per unit surface area of a standard thickness of said material in the path of said radiations may be maintained substantially constant over a range of thickness of specimens of said material to be measured and a given scale calibration of said detector is applicable for all thicknesses over said range.

3. A device for measuring the thickness of material comprising a source of penetrative radiations, the absorption of which radiations are substantially proportional to the thickness of said material on which the radiations are directed, a detector for said radiations, the said source being positioned to direct radiations against one surface of said material and the said detector positioned to receive those radiations which penetrate said material, means indicating the intensity of the detected radiations, means to alter the angle of incidence of the path of said radiations with respect to a surface of said material, and means for indicating the adjustment of said angle in relation to the nominal thickness of said material whereby the mass per unit surface area of said material in the path of said radiations may be made substantially the same throughout a range of thickness of specimens of said material to be measured.

4. A device for measuring the percentage change in thickness of material comprising a source of penetrative radiations, the absorption of which radiations are substantially proportional to the thickness of said material on which the radiations are directed, a detector for said radiations, the said source being positioned to direct radiations against one surface of said material and the said detector positioned to receive those radiations which penetrate said material, means indicating the intensity of the detected radiations, said last named means calibrated to indicate percentage change in thickness of said material, means to advance the said material between the said source and the said detector, means to alter the angle of incidence of the path of said radiations with respect to a surface of said material, and means for indicating the adjustment of said angle in relation to the nominal thickness of said material whereby the mass per unit surface area of a standard thickness of said material in the path of said radiations may be made substantially the same throughout a range of standard thicknesses of specimens of said material to be measured.

5. A device for measuring the thickness of sheet material comprising a source of beta radiations, the absorption of which radiations are substantially proportional to the thickness of said material on which the radiations are directed, a detector for said radiations, the said source being positioned to direct radiations against one surface of said material and the said detector positioned to receive those radiations which penetrate said material, means indicating the intensity of the detected radiations, means to alter the angle of incidence of the path of said radiations with respect to a surface of said material, and means for indicating the adjustment of said angle in relation to the nominal thickness of said material whereby the mass per unit surface area of said material in the path of said radiations may be made substantially the same throughout a range of thickness of specimens of said material to be measured.

6. A device for measuring the thickness of sheet material comprising a source of X-ray radiations, the absorption of which radiations are substantially proportional to the thickness of said material on which the radiations are directed, a detector for said radiations, the said source being positioned to direct radiations against one surface of said material and the said detector positioned to receive those radiations which penetrate said material, means indicating the intensity of the detected radiations, means to alter the angle of incidence of the path of said radiations with respect to a surface of said material whereby the mass per unit surface area of said material, and means for indicating the adjustment of said angle in relation to the nominal thickness of said material in the path of said radiations may be made substantially the same throughout a range of thickness of specimens of said material to be measured.

7. The method of gauging a range of thickness dimensions for material having elongated substantially parallel surface dimensions transverse to said thickness dimensions comprising the steps of directing on one of said surfaces constant intensity penetrative radiations which are absorbed in accordance with the mass of said material in the path of said radiation per unit of irradiated area, detecting the unabsorbed radiations emerging from the other of said surfaces, utilizing the intensity of said unabsorbed radiations detected for gauging the thickness of said material, adjusting the angle of incidence of said radiations directed on said one surface, and indicating the adjustment of said angle of incidence in relation to the nominal thickness of the material under test to provide a substantially constant mass of said material in the path of said radiation per unit of irradiated area for different magnitudes of said thickness dimensions within said range.

References Cited in the file of this patent

UNITED STATES PATENTS

| | | |
|---|---|---|
| 2,486,902 | Wolf | Nov. 1, 1949 |
| 2,501,560 | Blau | Mar. 21, 1950 |
| 2,534,352 | Herzog | Dec. 19, 1950 |
| 2,674,695 | Grace | Apr. 6, 1954 |